(12) United States Patent
Ito et al.

(10) Patent No.: US 12,371,042 B2
(45) Date of Patent: Jul. 29, 2025

(54) DRIVING ASSISTANCE APPARATUS

(71) Applicant: TOYOTA JIDOSHA KABUSHIKI KAISHA, Toyota (JP)

(72) Inventors: Hiroaki Ito, Nisshin (JP); Yoshitaka Kijima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 448 days.

(21) Appl. No.: 17/965,200

(22) Filed: Oct. 13, 2022

(65) Prior Publication Data

US 2023/0143515 A1 May 11, 2023

(51) Int. Cl.
| | |
|---|---|
| *B60W 50/14* | (2020.01) |
| *B60W 40/08* | (2012.01) |
| *B60W 40/09* | (2012.01) |
| *B60W 50/00* | (2006.01) |
| *G06V 20/59* | (2022.01) |
| *B60W 30/18* | (2012.01) |

(52) U.S. Cl.
CPC ............ *B60W 50/14* (2013.01); *B60W 40/08* (2013.01); *B60W 40/09* (2013.01); *B60W 50/0098* (2013.01); *G06V 20/597* (2022.01); *B60W 30/18154* (2013.01); *B60W 2040/0818* (2013.01); *B60W 2050/143* (2013.01); *B60W 2540/229* (2020.02)

(58) Field of Classification Search
None
See application file for complete search history.

(56) References Cited

U.S. PATENT DOCUMENTS

| | | | |
|---|---|---|---|
| 6,583,403 B1 | 6/2003 | Koike et al. | |
| 9,835,468 B2 | 12/2017 | Yoshitomi et al. | |
| 10,017,178 B2 | 7/2018 | Morimoto et al. | |
| 10,132,642 B2 | 11/2018 | Yoshitomi et al. | |
| 10,679,077 B2 | 6/2020 | Kinoshita et al. | |
| 11,010,624 B2 | 5/2021 | Hayashi et al. | |
| 11,017,247 B2 | 5/2021 | Hayashi et al. | |
| 11,117,595 B2 | 9/2021 | Sasaki et al. | |
| 2016/0001781 A1* | 1/2016 | Fung | G07C 9/37 701/36 |
| 2017/0154527 A1* | 6/2017 | Yoshitomi | G08G 1/096783 |
| 2020/0139992 A1 | 5/2020 | Oba | |
| 2020/0247420 A1* | 8/2020 | Gunaratne | G06V 10/82 |
| 2021/0247526 A1 | 8/2021 | Kijima | |
| 2022/0009524 A1* | 1/2022 | Oba | B60W 60/0057 |

FOREIGN PATENT DOCUMENTS

| | | |
|---|---|---|
| JP | 2001-191876 A | 7/2001 |
| JP | 2012-053749 A | 3/2012 |
| JP | WO2019/017216 A1 | 5/2020 |
| JP | 2021-47565 A | 3/2021 |

* cited by examiner

*Primary Examiner* — Peter D Nolan
*Assistant Examiner* — Michael F Whalen
(74) *Attorney, Agent, or Firm* — Oliff PLC (57) ABSTRACT

A driving assistance apparatus configured to provide driving assistance regarding a traffic light to a driver of a host vehicle when the traffic light in front of the host vehicle is in a passage prohibited state, wherein the driving assistance apparatus determines whether the driver is in a careless driving state, and suppresses driving assistance regarding the traffic light when the driver is determined to be in the careless driving state even when the traffic light in front of the host vehicle is in the passage prohibited state.

8 Claims, 5 Drawing Sheets

DRIVING ASSISTANCE APPARATUS

CROSS-REFERENCE TO RELATED APPLICATION

This application claims the benefit of priority from Japanese Patent Application No. 2021-184202, filed Nov. 11, 2021, the entire contents of which are incorporated herein by reference.

TECHNICAL FIELD

The present disclosure relates to a driving assistance apparatus.

BACKGROUND

As prior art, JP 2021-047565 discloses a driving assistance apparatus. This publication discloses that when the vehicle speed is higher than a vehicle speed threshold value, display of an image corresponding to a passage prohibited state of traffic light on an in-vehicle display is prohibited.

SUMMARY

In the case of making a right turn after entering an intersection, even if the traffic light ahead of the vehicle is switched to the passage prohibited state, the driver advances the vehicle to make a right turn. In such a case, if an alert is issued to the driver due to the passage prohibited state of traffic light, the driver may feel annoyed.

A driving assistance apparatus according to an aspect of the present disclosure that is configured to provide driving assistance regarding a traffic light in front of a host vehicle to a driver of the host vehicle when the traffic light is in a passage prohibited state. The driving assistance apparatus includes a careless driving state determination unit configured to determine whether the driver is in a careless driving state based on the driving operation of the driver and a driving assistance unit configured to suppress driving assistance regarding the traffic light when the careless driving state determination unit determines that the driver is not in the careless driving state even if the traffic light in front of the host vehicle is in the passage prohibited state. The careless driving state determination unit determines that the driver is not in the careless driving state when at least one of the acceleration intention of the driver, the deceleration intention of the driver, the steering intention of the driver, and the right or left turn intention of the driver is estimated to be present based on the driving operation of the driver, and determines that the driver is in the careless driving state when all of the acceleration intention of the driver, the deceleration intention of the driver, the steering intention of the driver, and the right or left turn intention of the driver are estimated not to be present.

The driving assistance apparatus according to an aspect of the present disclosure determines that the driver is not in the careless driving state when it is estimated that at least one of the acceleration intention of the driver, the deceleration intention of the driver, the steering intention of the driver, and the right or left turn intention of the driver is present, and suppresses the driving assistance regarding the traffic light even when the traffic light in front of the host vehicle is in the passage prohibited state. Thus, it is possible to reduce the annoyance of the driving assistance to the driver who is not in the careless driving state.

In the driving assistance apparatus according to an aspect of the present disclosure, the careless driving state determination unit determines whether the driver is in an awake state based on a driver captured image of a driver monitor camera that images the driver, and determines that the driver is in the careless driving state regardless of the driving operation of the driver when it is determined that the driver is not in the awake state.

In the driving assistance apparatus according to one aspect of the present disclosure, the driving assistance unit determines whether the driver is in an awake state based on a driver captured image of a driver monitor camera that captures an image of the driver, and when the driving assistance unit determines that the driver is not in the awake state, the driving assistance unit advances a timing of an alert to the driver in the driving assistance compared with when the driving assistance unit determines that the driver is in the awake state.

In the driving assistance apparatus according to one aspect of the present disclosure, the driving assistance unit issues an alert by both audio output and image display as the driving assistance when traffic light ahead of the host vehicle is in a passage prohibited state and the careless driving state determination unit does not determine that the driver is in a careless driving state, and the driving assistance unit issues an alert by audio output or image display as the driving assistance, when the careless driving state determination unit determine that the driver is in a careless driving state.

According to one aspect of the present disclosure, it is possible to reduce the annoyance of driving assistance felt by a driver who is not in the careless driving state.

DETAILED DESCRIPTION

Hereinafter, embodiments of the present disclosure will be described with reference to the drawings.

Figure 1:
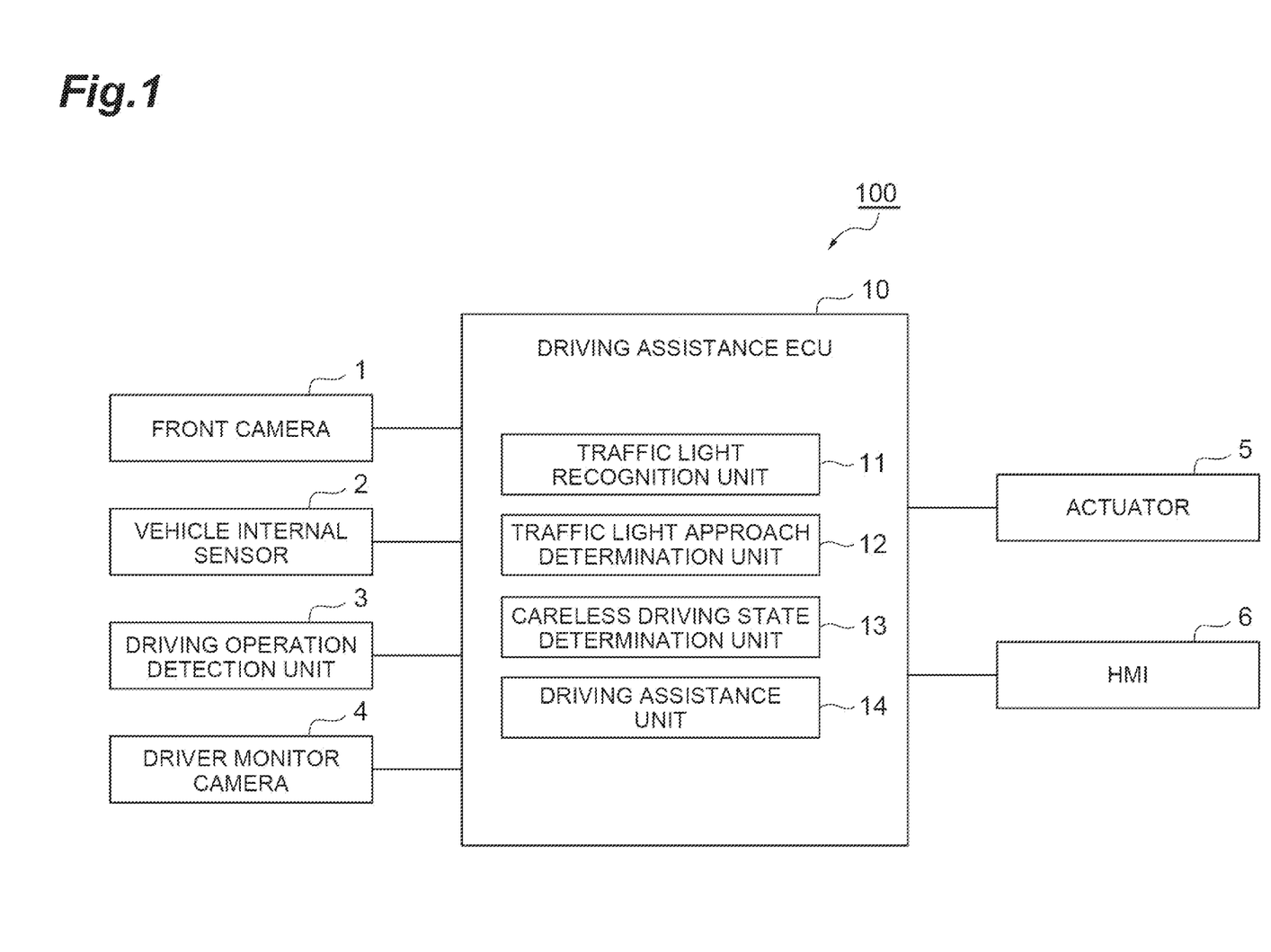
FIG. 1 is a block diagram illustrating a driving assistance apparatus according to an embodiment.

A driving assistance apparatus 100 illustrated by FIG. 1 is a device that is mounted on a host vehicle such as a passenger car and supports driving of the host vehicle by a driver. The driving assistance apparatus 100 provides driving assistance to the driver according to a lighting state of traffic light in front of the host vehicle. The host vehicle may be partially automated driving vehicle.

Configuration of Driving Assistance Apparatus

Hereinafter, the configuration of the driving assistance apparatus 100 will be described with reference to the drawings. As illustrated in FIG. 1, the driving assistance apparatus 100 is provided with a driving assistance Electronic Control Unit 10 (driving assistance ECU) that manages the apparatus. A driving assistance ECU 10 is an electronic control unit including a central processing unit (CPU), a read only memory (ROM), a random-access memory (RAM), and the like. In the driving assistance ECU 10, for example, a program stored in the ROM is executed by the CPU to realize various functions. The driving assistance ECU 10 may be composed of a plurality of electronic units.

The driving assistance ECU 10 is connected to a front camera 1, a vehicle internal sensor 2, a driving operation detection unit 3, a driver monitor camera 4, an actuator 5, and HMI 6 [Human Machine Interface].

The front camera 1 is a camera for capturing an image in front of the host vehicle. The front camera 1 is provided, for example, on the back side of the windshield of the host vehicle. The front camera 1 transmits the captured image in front of the host vehicle to the driving assistance ECU 10. The front camera 1 may be a monocular camera or a stereo camera.

The vehicle internal sensor 2 is a detection device that detects a traveling state of the host vehicle. The vehicle internal sensor 2 may include a vehicle speed sensor, an acceleration sensor, and a yaw rate sensor. The vehicle speed sensor is a detector that detects the speed of the host vehicle. As the vehicle speed sensor, for example, a wheel speed sensor that is provided on a wheel of a host vehicle, a drive shaft that rotates integrally with the wheel, or the like and detects the rotation speed of the wheel is used. The vehicle speed sensor transmits detected vehicle speed information (wheel speed information) to the driving assistance ECU 10.

The acceleration sensor is a detector that detects the acceleration of the host vehicle. The acceleration sensor may include a longitudinal acceleration sensor that detects acceleration in the longitudinal direction of the host vehicle and a lateral acceleration sensor that detects lateral acceleration of the host vehicle. For example, the acceleration sensor transmits acceleration information of the host vehicle to the driving assistance ECU 10. The yaw rate sensor is a detector that detects a yaw rate (rotational angular velocity) about the vertical axis of the center of gravity of the host vehicle. As the yaw rate sensor, for example, a gyro sensor can be used. The yaw rate sensor transmits the detected yaw rate information of the host vehicle to the driving assistance ECU 10.

The driving operation detection unit 3 is a detection device that detects a driving operation of a host vehicle by a driver. The driving operation detection unit 3 may include at least one of an accelerator pedal sensor, a brake pedal sensor, a steering sensor, and a direction indicator light sensor.

The accelerator pedal sensor is provided on, for example, a shaft portion of an accelerator pedal, and detects an operation amount of the accelerator pedal by the driver. The operation amount of the accelerator pedal may be a depression force or a depression amount. The direction indicator light sensor detects an operation (on/off operation) of the direction indicator light by the driver. The direction indicator light sensor can be provided, for example, on an operation lever of the direction indicator light.

The brake pedal sensor may be provided, for example, on a shaft portion of the brake pedal, and detects an operation amount of the brake pedal by the driver. The operation amount of the brake pedal may be depression force or depression amount. The steering sensor is, for example, provided on a steering shaft of a host vehicle, and detects a steering torque applied to a steering wheel by a driver. The direction indicator light sensor detects an operation of a direction indicator light lever of the host vehicle by the driver.

The driver monitor camera 4 is a camera for imaging the driver. The driver monitor camera 4 is provided, for example, on a cover of a steering column in front of the driver, and captures an image of the head including the face of the driver. The driver monitor camera 4 transmits the driver captured image to the driving assistance ECU 10.

The actuator 5 is used to control the host vehicle. The actuator 5 includes at least a drive actuator and a brake actuator. The actuator 5 may include a steering actuator. The drive actuator controls the amount of air supplied to the engine (throttle opening) in accordance with a control signal from the driving assistance ECU 10, and controls the driving force of the host vehicle. When the host vehicle is a hybrid electric vehicle, a control signal from the driving assistance ECU 10 is input to the motor as a power source in addition to the amount of air supplied to the engine, and the driving force is controlled. When the host vehicle is a battery electric vehicle, a control signal from the driving assistance ECU 10 is input to a motor as a power source to control the driving force. The motor as a power source in these cases constitutes the actuator 5.

The brake actuator controls the brake system in response to a control signal from the driving assistance ECU 10 and controls the braking force applied to the wheels of the host vehicle. As the brake system, for example, a hydraulic brake system can be used. The steering actuator controls driving of an assist motor for controlling steering torque in the electric power steering system according to a control signal from the driving assistance ECU 10. Accordingly, the steering actuator controls the steering torque of the host vehicle.

The HMI 6 is an interface for inputting and outputting information between the driving assistance apparatus 100 and the driver. The HMI 6 includes a display and a speaker. The HMI 6 performs image output on a display and audio output from a speaker in response to a control signal from the driving assistance ECU 10. The display may be a head up display (HUD) or a multi information display (MID) provided in an instrument panel.

Next, the functional configuration of the driving assistance ECU 10 will be described. As illustrated in FIG. 1, the driving assistance ECU 10 includes a traffic light recognition unit 11, a traffic light approach determination unit 12, a careless driving state determination unit 13, and a driving assistance unit 14. Note that some of the functions of the driving assistance ECU 10 described below may be executed by servers capable of communicating with the host vehicle.

The traffic light recognition unit 11 recognizes the lighting state of traffic light in front of the host vehicle based on the captured image of the front camera 1. The lighting state of the traffic light includes a passage permission state, a passage prohibited state, and a signal transition state. The passage permission state is a state in which passage of the vehicle is permitted. The passage prohibited state is a state in which passage of the vehicle is prohibited. The signal transition state is a state transitioning from the passage permission state to the passage prohibited state. The signal transition state is need not necessarily be included in the lighting state of the traffic light. The traffic light recognition unit 11 recognizes traffic light by a known image processing method. Known image processing techniques include at least one of edge extraction, noise removal, pattern matching, and deep learning. The traffic light recognition unit 11 recognizes whether the traffic light is in a passage prohibited state.

The traffic light approach determination unit 12 determines whether the host vehicle has approached the traffic light when the traffic light recognition unit 11 recognizes that the traffic light is in a passage prohibited state. The traffic light approach determination unit 12 determines that the host vehicle has approached the traffic light when the distance between the host vehicle and the traffic light is less than a distance threshold value based on, for example, a captured image of the front camera 1 or a detection result of an in-vehicle radar sensor. The traffic light approach determination unit 12 determines the approach of the host vehicle to the traffic light based on, for example, a captured image of the front camera 1 or a detection result of an in-vehicle radar sensor. The traffic light approach determination unit 12 may determine that the host vehicle has approached the traffic light when a time to collision (TTC) of the host vehicle with respect to traffic light is less than a TTC threshold value. The distance threshold value and the TTC threshold value are threshold values set in advance. Threshold values used in the following description are all threshold values set in advance.

Figure 2:
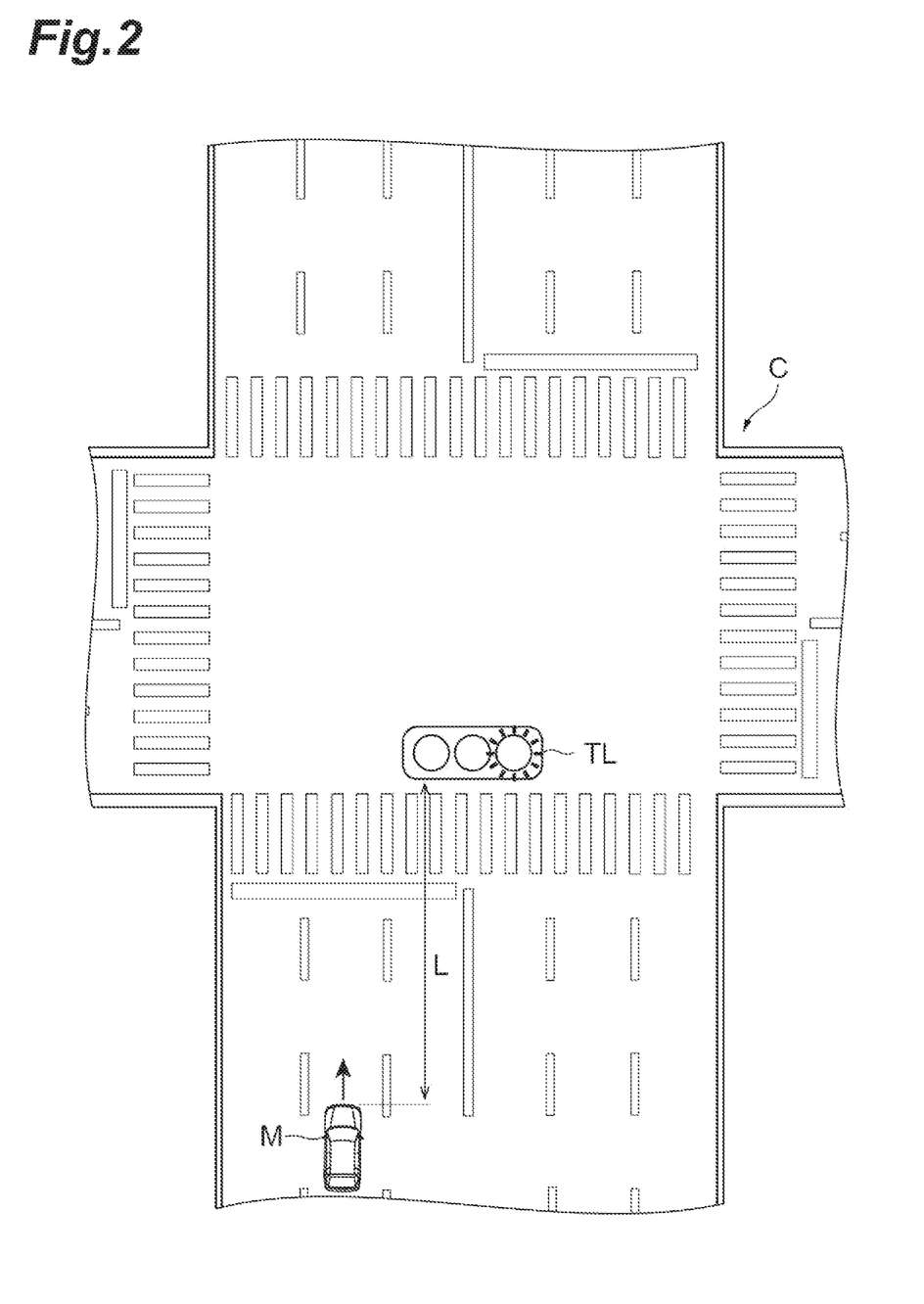
FIG. 2 is a diagram illustrating a situation in which vehicle is approaching traffic light in a passage prohibited state.

FIG. 2 is a diagram illustrating a situation in which a host vehicle has approached a traffic light in the passage prohibited state. FIG. 2 illustrates an intersection C, a host vehicle M, a traffic light TL, and a distance L. The distance L is the distance between the host vehicle M and the traffic light TL. In the situation illustrated by FIG. 2, the traffic light approach determination unit 12 determines that the host vehicle has approached the traffic light when, for example, the distance L between the host vehicle M and the traffic light TL is less than the distance threshold value. The traffic light approach determination unit 12 may determine whether the host vehicle has approached the traffic light when the traffic light recognition unit 11 recognizes that the traffic light is in a passage prohibited state or a signal transition state.

The careless driving state determination unit 13 determines whether the driver is in a careless driving state. For example, when the traffic light approach determination unit 12 determines that the host vehicle has approached the traffic light, the careless driving state determination unit 13 determines the careless driving state of the driver with respect to the traffic light.

The careless driving state is a state in which the driver is driving carelessly without accurately recognizing the lighting state of the traffic lights. The careless driving state determination unit 13 determines that the driver is not in the careless driving state, for example, when it is estimated that at least one of the acceleration intention of the driver, the deceleration intention of the driver, the steering intention of the driver, and the right or left turn intention of the driver is present. The careless driving state determination unit 13 determines that the driver is in the careless driving state when it is determined that none of the acceleration intention of the driver, the deceleration intention of the driver, the steering intention of the driver, and the right or left turn intention of the driver exist.

The acceleration intention of the driver is an intention to accelerate the host vehicle in order for the driver to pass the traffic light based on the lighting state of the traffic light. The careless driving state determination unit 13 estimates that the acceleration intention is present in the driver when it is determined that the operation amount of the accelerator pedal by the driver is equal to or greater than the accelerator operation threshold value based on the detection result of the driving operation detection unit 3. The careless driving state determination unit 13 may estimate that the driver has an acceleration intention in a case where it is determined that the acceleration of the host vehicle is equal to or greater than the acceleration threshold value based on the detection result of the vehicle internal sensor 2.

The deceleration intention of the driver is an intention to decelerate the host vehicle in order for the driver to stop based on the lighting state of the traffic light. The careless driving state determination unit 13 estimates the deceleration intention of the driver based on, for example, the detection result of the driving operation detection unit 3. The careless driving state determination unit 13 estimates that the driver has deceleration intention when it is determined that the operation amount of the brake pedal by the driver is equal to or greater than the brake operation threshold value. When it is determined that the deceleration of the host vehicle is equal to or greater than the deceleration threshold value based on the detection result of the vehicle internal sensor 2, the careless driving state determination unit 13 may estimate that there is a deceleration intention to the driver.

The steering intention of the driver is an intention of the driver to steer the host vehicle based on the lighting state of the traffic light. The careless driving state determination unit 13 may estimate that the driver has a steering intention when it is determined that the steering amount of the driver is equal to or greater than the steering threshold value based on the detection result of the driving operation detection unit 3. The careless driving state determination unit 13 may estimate that the driver has a deceleration intention when it is determined that the yaw rate of the host vehicle is equal to or greater than the yaw rate threshold value based on the detection result of the vehicle internal sensor 2.

The right or left turn intention of the driver is an intention of the driver to steer the host vehicle based on the lighting state of traffic light. The careless driving state determination unit 13 determines the right or left turn intention of the driver, for example, based on the detection result of the driving operation detection unit 3. The careless driving state determination unit 13 estimates that the driver has a right or left turn intention when it is determined that the direction indicator light of the host vehicle is operated to be in the lighted state.

Figure 3:
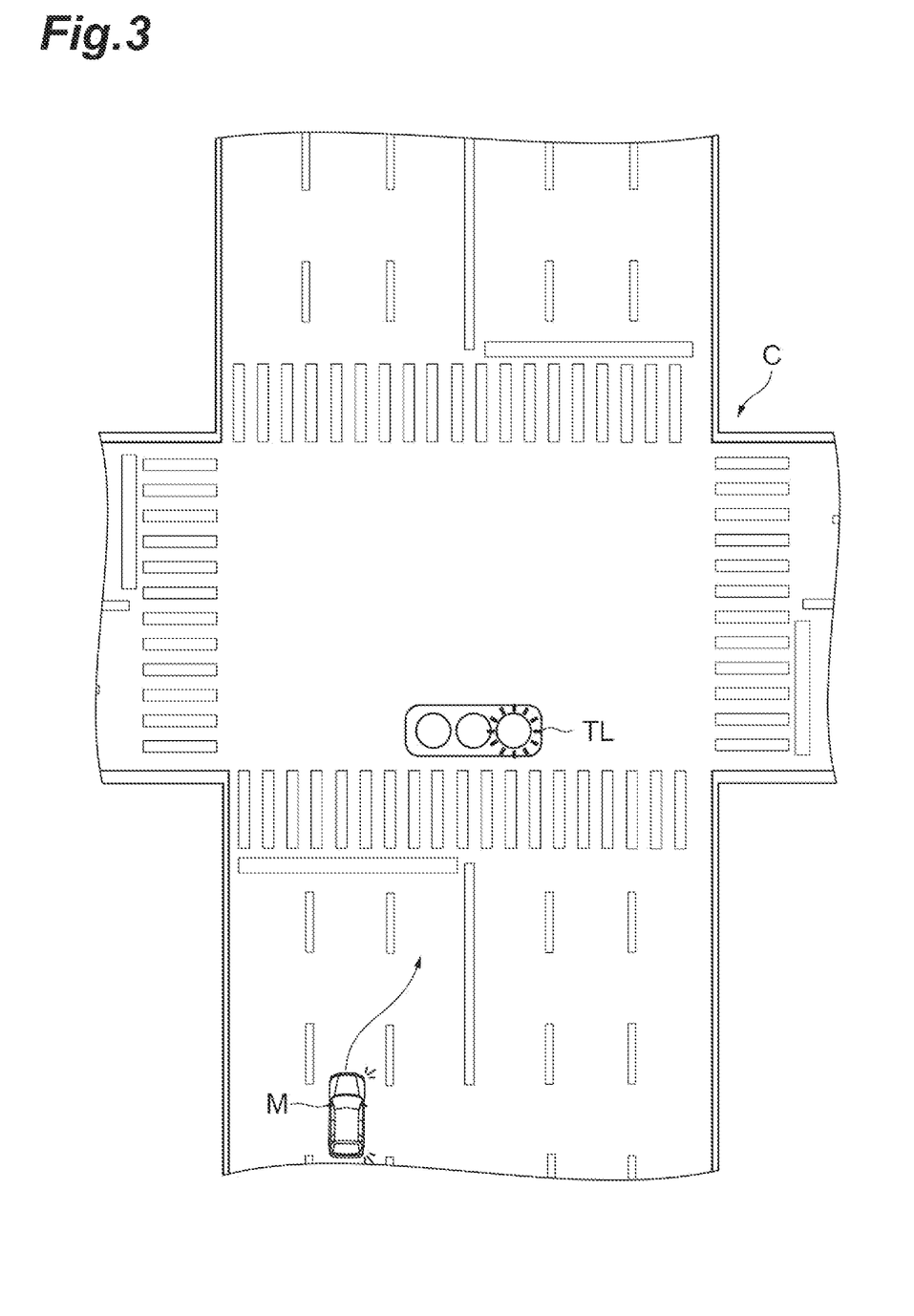
FIG. 3 is a diagram illustrating a situation in which it is determined that the right or left turn intention of the driver is present.

FIG. 3 is a diagram illustrating a situation in which it is determined that the right or left turn intention of the driver is present. In FIG. 3, the host vehicle M turns on the direction indicator light in the right direction to change the lane to the right lane. The careless driving state determination unit 13 estimates that the driver has a right or left turn intention because the direction indicator light in the right direction is operated to be in the lighted state in the situation illustrated by FIG. 3.

The careless driving state determination unit 13 may recognize the line of sight and the head direction of the driver based on the driver captured image of the driver monitor camera 4. The careless driving state determination unit 13 may determine whether the line of sight of the driver is directed toward the traffic light based on the recognized line of sight and head direction of the driver. The careless driving state determination unit 13 may determine that the driver is not in the careless driving state, even if it is not possible to estimate that there is acceleration intention or deceleration intention of the driver, when it is determined that the line of sight of the driver is directed toward traffic light.

The careless driving state determination unit 13 may estimate the intention of the driver by taking into consideration that there is a difference between the timing at which the traffic light approach determination unit 12 determines that the host vehicle has approached the traffic light and the timing at which the driver recognizes the traffic light. A timing at which it is determined that the host vehicle has approached the traffic light is referred to as an approach determination timing. For example, when it is determined that the operation amount of the accelerator pedal by the driver is equal to or greater than the accelerator operation threshold value in a certain period of time before and after the approach determination timing, it is considered that the driver recognizes the lighting state of traffic light and has acceleration intention. Therefore, the careless driving state determination unit 13 may estimate that the driver has the acceleration intention even if the driver does not perform the accelerator operation at the approach determination timing. The same applies to a deceleration intention, a steering intention, and a right or left turn intention. The certain period of time may be 1 second or 3 seconds. The certain period of time may be 5 seconds or 10 seconds or more.

The careless driving state determination unit 13 may determine whether the driver is in the awake state based on the driver captured image of the driver monitor camera 4. The awake state is a state in which the driving consciousness of the driver is not lowered due to sleepiness or the like.

The careless driving state determination unit 13 may determine whether the driver is in the awake state based on at least one of an eye closing rate of the driver at regular time intervals, an eye-opening situation of the eye, a blink frequency, and an eye movement. The careless driving state determination unit 13 determines that the driver is not in the awake state, for example, when the eye closing rate of the driver at regular time intervals is equal to or greater than an eye closing rate threshold value. A determination method of the awake state is not particularly limited, and a well-known method can be adopted.

The careless driving state determination unit 13 may determine whether or not the driver is in the awake state from the sight line and head direction of the driver. The careless driving state determination unit 13 may determine that the driver is in the awake state when the line of sight of the driver turns to the traffic light. The careless driving state determination unit 13 may determine that the driver is in the careless driving state regardless of the determination result based on the driving operation of the driver when it is determined that the driver is not in the awake state.

The driving assistance unit 14 performs driving assistance to the driver with respect to the traffic light when the traffic light approach determination unit 12 determines that the host vehicle has approached the traffic light. The driving assistance may include an alert to the driver and automatic deceleration control of the vehicle.

The driving assistance unit 14 issues, for example, an alert for notifying the lighting state of traffic light to the driver. The driving assistance unit 14 performs an alert by sending a control signal to the HMI 6. The alert may, for example, be an output of a buzzer sound. The alert may be an audio output or an image display in the MID of the instrument panel. The image display is, for example, display of a predetermined icon. The alert may be a projection display on the windshield of the host vehicle by the HUD. The projection display is, for example, display of an icon or text display.

The driving assistance unit 14 may perform automatic deceleration control of the host vehicle. The driving assistance unit 14 performs automatic deceleration control by transmitting a control signal to the brake actuator of the actuator 5. The driving assistance unit 14 performs automatic deceleration control so that the speed of the host vehicle becomes equal to or lower than a predetermined speed before the host vehicle reaches traffic light.

The driving assistance unit 14 suppresses the driving assistance regarding the traffic light when the traffic light approach determination unit 12 determines that the host vehicle has approached the traffic light and the careless driving state determination unit 13 determines that the driver is not in the careless driving state. The suppression of the driving assistance is to change the driving assistance content to a driving assistance content having a small effect on the driver. The suppression of the driving assistance includes prohibition of the driving assistance.

The driving assistance unit 14 may issue an alert by both audio output and image display as driving assistance when it is determined by the careless driving state determination unit 13 that the driver is in the careless driving state. The driving assistance unit 14 may issue an alert by sound output or image display as driving assistance when it is not determined that the driver is in the careless driving state.

The driving assistance unit 14 may perform automatic deceleration control as driving assistance when it is determined by the careless driving state determination unit 13 that the driver is in the careless driving state. The driving assistance unit 14 may perform only alert as driving assistance when the driver is not determined to be in the careless driving state.

Further, when it is determined by the careless driving state determination unit 13 that the driver is not in the awake state, the driving assistance unit 14 may advance the timing of the alert to the driver in the driving assistance as compared to the case where it is determined that the driver is in the awake state. For example, when it is determined that the driver is not in the awake state, the driving assistance unit 14 advances the approach determination timing by the traffic light approach determination unit 12 to advance the timing of the alert. The traffic light approach determination unit 12 can advance the approach determination timing by changing the above-described distance threshold value or TTC threshold value to a large value.

Processing Method of Driving Support Apparatus

Figure 4:
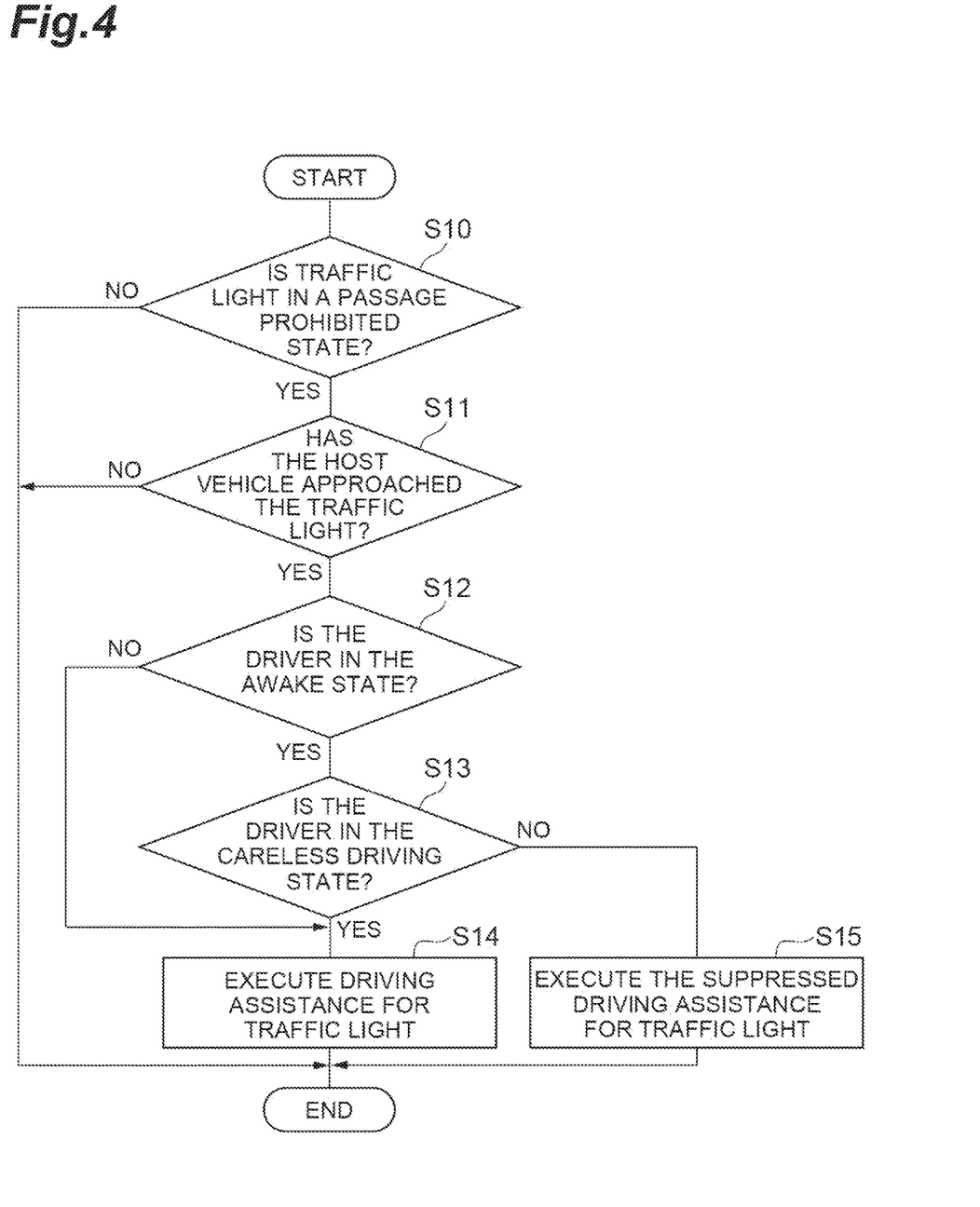
FIG. 4 is a flowchart illustrating an example of driving assistance execution processing.

Next, the processing of the driving assistance apparatus 100 will be described with reference to the drawings. FIG. 4 is a flowchart illustrating an example of driving assistance execution processing. The driving assistance execution processing is executed when the driver has turned on the driving assistance function.

As illustrated in FIG. 4, the driving assistance ECU 10 of the driving assistance apparatus 100 recognizes whether traffic light is in a passage prohibited state by the traffic light recognition unit 11 as S10. The traffic light recognition unit 11 recognizes traffic light by a known image processing method such as edge extraction, noise elimination, pattern matching, deep learning, or the like. When it is determined that the traffic light is in the passage prohibited state (YES in S10), the driving assistance ECU 10 transitions to S11. If the traffic light is not determined to be in the passage prohibited state (NO in S10), the driving assistance ECU 10 ends the current driving assistance execution processing.

In S11, the driving assistance ECU 10 determines whether the host vehicle has approached the traffic light through the traffic light approach determination unit 12. The traffic light approach determination unit 12 determines that the host vehicle has approached the traffic light when the distance between the host vehicle and the traffic light is less than a distance threshold value based on, for example, a captured image of the front camera 1 or a detection result of an in-vehicle radar sensor. If it is determined that the host vehicle has approached traffic light (YES in S11), the driving assistance ECU 10 transitions to S12. When it is not determined that the host vehicle approaches the traffic light (NO in S11), the driving assistance ECU 10 ends the driving assistance execution processing.

In S12, the driving assistance ECU 10 determines whether or not the driver is in the awake state by the careless driving state determination unit 13. The careless driving state determination unit 13 determines the awake state based on the driver captured image of the driver monitor camera 4 that images the driver. When it is determined that the driver is in the awake state (YES in S12), the driving assistance ECU 10 transitions to S13. When the driving assistance ECU 10 does not determine that the driver is in the awake state (NO in S12), the driving assistance ECU 10 transits to S14. If the driving assistance ECU 10 does not determine that the driver is in the awake state, it regards the driver as being in the careless driving state.

In S13, the driving assistance ECU 10 determines whether the driver is in the careless driving state by the careless driving state determination unit 13. The careless driving state determination unit 13 may determine that the driver is not in the careless driving state when it is estimated that at least one of an acceleration intention of the driver, a deceleration intention of the driver, a steering intention of the driver, and a right or left turn intention of the driver is present. When it is determined that the driver is in the careless driving state (YES in S13), the driving assistance ECU 10 transitions to S14. If the driver is not determined to be in the careless driving state (NO in S13), the driving assistance ECU 10 transitions to S15.

In S14, the driving assistance ECU 10 executes driving assistance regarding traffic light by the driving assistance unit 14. The driving assistance unit 14 alerts by both audio output and image display as driving assistance via, for example, HMI 6. Thereafter, the current driving assistance execution processing is ended.

In S15, the driving assistance ECU 10 executes the suppressed driving assistance regarding traffic light by the driving assistance unit 14. The driving assistance unit 14 may alert by audio output or image display as driving assistance, for example, through the HMI 6. Thereafter, the current driving assistance execution processing is ended. Note that the driving assistance ECU 10 may select prohibition of driving assistance as suppression of driving assistance regarding traffic light.

Figure 5:
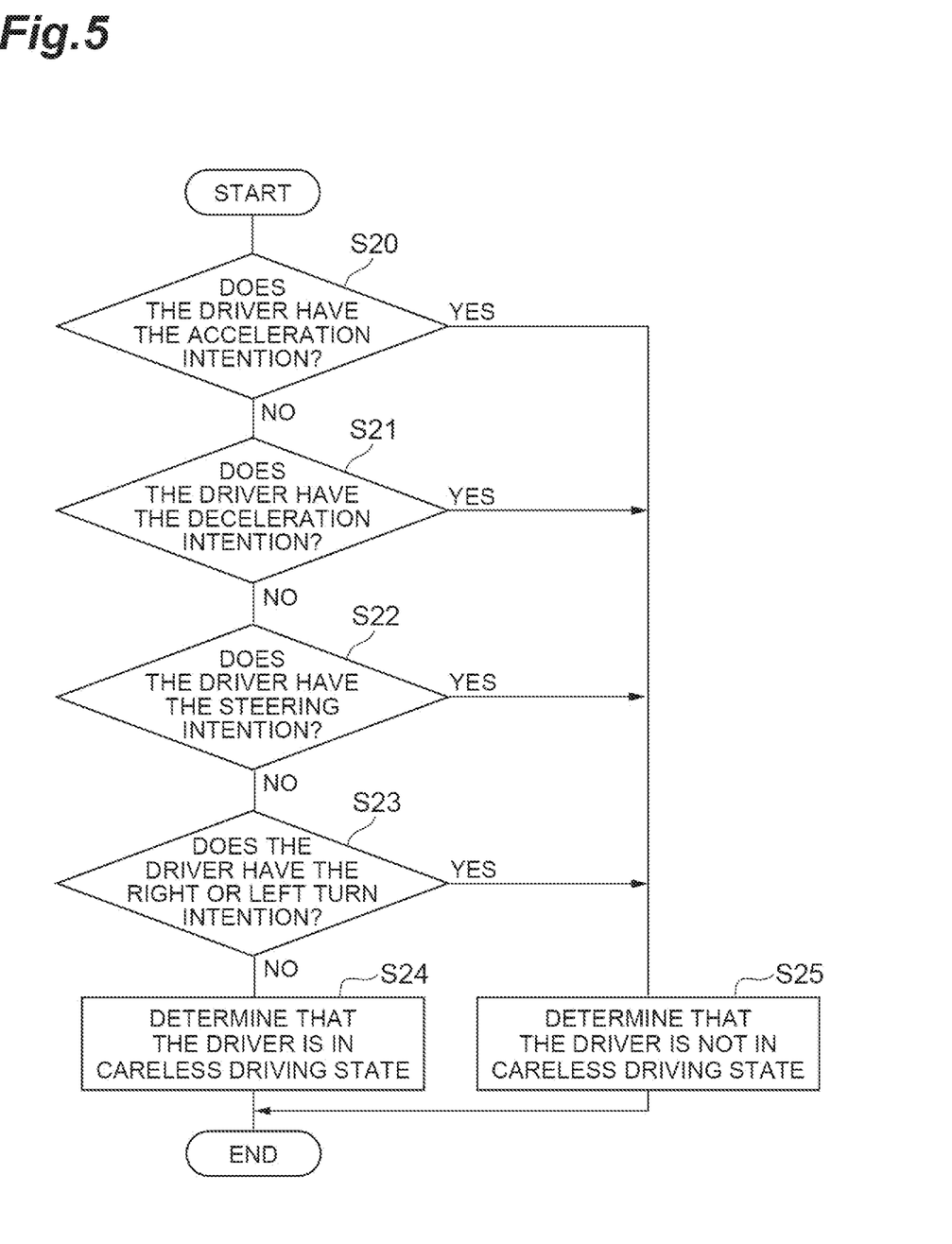
FIG. 5 is a flowchart illustrating an example of careless driving state determination processing.

FIG. 5 is a flowchart illustrating an example of careless driving state determination processing. Careless driving state determination processing corresponds to processing of S13 of FIG. 4.

As illustrated in FIG. 5, the driving assistance ECU 10 estimates whether the driver has the acceleration intention by the careless driving state determination unit 13 as S20. When the driving assistance ECU 10 estimates that the driver has no acceleration intention (YES in S20), the reservation unit shifts to S21. If the driving assistance ECU 10 does not estimate that the driver has no acceleration intention (NO in S20), the driving assistance ECU 10 transitions to S25. The case where it is not estimated that there is no acceleration intention in the driver is a case where it is estimated that there is acceleration intention.

In S21, the driving assistance ECU 10 estimates whether the driver has the deceleration intention by the careless driving state determination unit 13. If the driving assistance ECU 10 estimates that there is no deceleration intention for the driver (YES in S21), the driving assistance ECU 10 transitions to S22. When the driving assistance ECU 10 does not estimate that there is no deceleration intention for the driver (that is, when it is estimated that there is a deceleration intention) (NO in S21), the driving assistance ECU 10 transitions to S25.

In S22, the driving assistance ECU 10 estimates whether the driver has the steering intention by the careless driving state determination unit 13. If the driving assistance ECU 10 estimates that the driver has no steering intention (YES in S22), the driving assistance ECU 10 transitions to S23. When the driving assistance ECU 10 does not estimate that the driver has no steering intention (that is, when it is estimated that there is a steering intention) (NO in S22), the driving assistance ECU 10 transitions to S25.

In S23, the driving assistance ECU 10 estimates whether the driver has the right or left turn intention by the careless driving state determination unit 13. When the driving assistance ECU 10 estimates that there is no right or left turn intention for the driver (YES in S23), the driving assistance ECU 10 transitions to S24. If the driving assistance ECU 10 does not estimate that there is no right or left turn intention for the driver (NO in S23), the driving assistance ECU 10 transitions to S25. The case where it is not estimated that there is no right or left turn intention in the driver is a case where it is estimated that there is right or left turn intention.

In S24, the driving assistance ECU 10 determines that the driver is in careless driving state by the careless driving state determination unit 13. Thereafter, the driving assistance ECU 10 ends the current careless driving state determination processing.

In S25, the driving assistance ECU 10 determines that the driver is not in careless driving state by the careless driving state determination unit 13. Thereafter, the driving assistance ECU 10 ends the careless driving state determination processing.

The driving assistance apparatus 100 according to the present embodiment described above determines that the driver is not in the careless driving state when it is estimated that at least one of the acceleration intention of the driver, the deceleration intention of the driver, the steering intention of the driver, and the right or left turn intention of the driver is present, and suppresses the driving assistance for the traffic light even when the traffic light in front of the host vehicle is in the passage prohibited state. Thus, it is possible to reduce the annoyance of the driving assistance to the driver who is not in the careless driving state.

In addition, according to the driving assistance apparatus 100, when the awake state of the driver is determined and the driver is not in the awake state, since there is a high possibility that a driving operation such as stepping on the accelerator pedal by the driver who is not in the awake state is erroneous, erroneous suppression of driving assistance based on such driving operation may be avoided by the driver being regarded as being in the careless driving state. Further, according to the driving assistance apparatus 100, in a case where it is determined that the driver is not in the awake state, the timing of the alert to the driver in the driving assistance is advanced compared to a case where it is determined that the driver is in the awake state, and thus it is also possible to execute an early alert to the driver who is not in the awake state.

Further, according to the driving assistance apparatus 100, when the driver is not determined to be in the careless driving state, an alert by both audio output and image display is executed as driving assistance, and when the driver is determined to be in the careless driving state by the careless driving state determination unit 13, an alert by audio output or image display is executed as driving assistance. Therefore, it is possible to reduce the annoyance of an alert by both audio output and image display to a driver who is not in the careless driving state.

Although the embodiment of the present disclosure has been described above, the present disclosure is not limited to the above-described embodiment. The present disclosure can be implemented in various forms in which various modifications and improvements are made based on the knowledge of those skilled in the art, including the above-described embodiments.

The driving assistance apparatus 100 does not necessarily have to have the driver monitor camera 4. In this case, the driving assistance apparatus 100 does not need to execute the process using the driver monitor camera 4.

What is claimed is:

1. A driving assistance apparatus configured to provide driving assistance regarding a traffic light in front of a host vehicle to a driver of the host vehicle when the traffic light is in a passage prohibited state, the driving assistance apparatus comprising:
    a processor programmed to:
        access a detected amount of operation amount of an accelerator pedal operated by the driver;
        access a detected operation amount of a brake pedal operated by the driver
        access a detected steering amount of the driver;
        access an illumination state of a direction indicator of the host vehicle;
        access a driver-captured image from a driver monitor camera of the host vehicle;
        determine whether the driver is in a careless driving state based on a driving operation of the driver; and
    a driving assistance unit configured to suppress driving assistance regarding the traffic light when the careless driving state determination unit determines that the driver is not in the careless driving state even if the traffic light in front of the host vehicle is in the passage prohibited state,
    determine that the driver is not in the careless driving state when at least one of an acceleration intention of the driver, a deceleration intention of the driver, a steering intention of the driver, and a right or left turn intention of the driver is estimated to be present based on the driving operation of the driver;
    determine that the driver is in the careless driving state when none of the acceleration intention of the driver, the deceleration intention of the driver, the steering intention of the driver, and the right or left turn intention of the driver are estimated to be present;
    compare, within a predetermined period of time including an approach determination timing at which the host vehicle has approached the traffic light, the detected operation amount of the accelerator pedal to an accelerator operation threshold value;
    upon a determination that the detected operation amount of an accelerator pedal is equal to or greater than the accelerator operation threshold value, determine that the driver's acceleration intention with respect to the traffic light is present;
    compare, within the predetermined time period, the detected operation amount of a brake pedal to a brake operation threshold value;
    upon a determination that the detected operation amount of the brake pedal is equal to or greater than the brake operation threshold value, determine that the driver's deceleration intention with respect to the traffic light is present;
    compare, within the predetermined time period, the detected steering amount of the driver to a steering threshold value;
    upon a determination that the detected steering amount of the driver is equal to or greater than the steering threshold value, determine that the driver's steering intention with respect to the traffic light is present;
    determine, within the predetermined period of time, whether the direction indicator has been operated into an illuminated state;
    upon a determination that the direction indicator has been operated into an illuminated state, determine that the driver's right/left turn intention with respect to the traffic light is present; and
    based on the accessed driver-captured image, determine whether the driver's gaze is directed toward the traffic light; and
    upon a determination that the driver's gaze is directed toward the traffic light, determine that the driver is not in the careless driving state even if it is estimated that none of the driver's acceleration intention, the driver's deceleration intention, and the driver's right/left turn intention is present.

2. The driving assistance apparatus of claim 1, wherein the processor is programmed to determine whether the driver is in an awake state based on the accessed driver-captured image, and
    determine that the driver is in the careless driving state regardless of the driving operation of the driver when it is determined that the driver is not in the awake state.

3. The driving assistance apparatus according to claim 2, wherein, upon a determination that the driver is not in the awake state, the processor is programmed to advance a timing of an alert to the driver in the driving assistance compared with when the it is determined that the driver is in the awake state.

4. The driving assistance apparatus according to claim 3, wherein the processor is programmed to:
    issue an alert by both audio output and image display as the driving assistance, in a case that the traffic light ahead of the host vehicle is in the passage prohibited state and it has been determined that the driver is in the careless driving state, and
    issue an alert by audio output or image display as the driving assistance, in a case that it is not determined that the driver is in the careless driving state.

5. The driving assistance apparatus according to claim 2, wherein the processor is programmed to:
    issue an alert by both audio output and image display as the driving assistance, in a case that the traffic light ahead of the host vehicle is in the passage prohibited state and it has been determined that the driver is in the careless driving state, and
    issue an alert by audio output or image display as the driving assistance, in a case that it is not determined that the driver is in the careless driving state.

6. The driving assistance apparatus according to claim 1, wherein the processor is programmed to determine whether the driver is in an awake state based on the driver-captured image, and
    upon a determination that the driver is not in the awake state, advance a timing of an alert to the driver in the driving assistance compared with when it is determined that the driver is in the awake state.

7. The driving assistance apparatus according to claim 6, wherein the processor is programmed to:
    issue an alert by both audio output and image display as the driving assistance, in a case that the traffic light ahead of the host vehicle is in the passage prohibited state and it has been determined that the driver is in the careless driving state, and issue an alert by audio output or image display as the driving assistance, in a case that it is not determined that the driver is in the careless driving state.

8. The driving assistance apparatus according to claim 1, wherein the processor is programmed to:

issue an alert by both audio output and image display as the driving assistance, in a case that the traffic light ahead of the host vehicle is in the passage prohibited state and it has been determined that the driver is in the careless driving state, and issue an alert by audio output or image display as the driving assistance, in a case that it is not determined that the driver is in the careless driving state.

\* \* \* \* \*